(12) United States Patent
Sheth et al.

(10) Patent No.: US 11,665,148 B2
(45) Date of Patent: May 30, 2023

(54) SYSTEMS AND METHODS FOR ADDRESSING CRYPTOPROCESSOR HARDWARE SCALING LIMITATIONS

(71) Applicant: Cisco Technology Inc., San Jose, CA (US)

(72) Inventors: Sujal Sheth, Ahmedabad (IN); Eric Voit, Bethesda, MD (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 100 days.

(21) Appl. No.: 17/208,350

(22) Filed: Mar. 22, 2021

(65) Prior Publication Data

US 2022/0303256 A1    Sep. 22, 2022

(51) Int. Cl.
*H04L 9/40* (2022.01)
*G06F 21/60* (2013.01)

(52) U.S. Cl.
CPC ............ *H04L 63/08* (2013.01); *G06F 21/602* (2013.01)

(58) Field of Classification Search
CPC ............... H04L 63/08; H04L 2463/121; H04L 63/0428; G06F 21/602; G06F 21/57; G06F 2221/033; G06F 21/72
See application file for complete search history.

(56) References Cited

U.S. PATENT DOCUMENTS

| | | | | |
|---|---|---|---|---|
| 8,176,336 B1 * | 5/2012 | Mao | ................. | G06F 9/45558 |
| | | | | 713/189 |
| 8,392,709 B1 * | 3/2013 | Agrawal | ............ | H04L 9/3228 |
| | | | | 713/169 |
| 8,977,857 B1 * | 3/2015 | Triscon | ................ | H04L 9/3213 |
| | | | | 726/28 |
| 11,153,080 B1 * | 10/2021 | Nix | ........................ | H04L 63/045 |
| 11,210,412 B1 * | 12/2021 | Ghetti | .................. | H04L 63/083 |
| 11,423,374 B2 * | 8/2022 | Hardin | ................... | H04L 67/02 |
| 11,424,939 B1 * | 8/2022 | Allen | .................... | H04L 9/3218 |

(Continued)

OTHER PUBLICATIONS

Frederic Stumpft, et al., "Improving the Scalability of Platform Attestation," Conference paper, https://www.researchgate.net/publication/221608967, Jan. 2008.

(Continued)

*Primary Examiner* — Aravind K Moorthy
(74) *Attorney, Agent, or Firm* — Baker Botts L.L.P.

(57) ABSTRACT

The present disclosure is directed to systems and methods to address cryptoprocessor hardware scaling limitations, the method including the steps of establishing a communication path between a centralized server and a client device; generating, by the centralized server, a nonce for transmission to the client device, wherein the nonce is associated with an active time interval and corresponds to one of an existing nonce or a new nonce; transmitting the nonce to the client device; receiving a signed attestation result that includes the nonce from the client device, wherein, the signed attestation result comprises a previously-generated signed attestation result if the nonce corresponds to the existing nonce previously received by the client device; and the signed attestation result comprises a new signed attestation result if the nonce corresponds to the existing nonce newly received by the client device or corresponds to the new nonce.

20 Claims, 4 Drawing Sheets

(56) References Cited

U.S. PATENT DOCUMENTS

| | | | | |
|---|---|---|---|---|
| 2004/0039946 | A1* | 2/2004 | Smith | H04L 63/0853 |
| | | | | 726/6 |
| 2004/0049676 | A1* | 3/2004 | Dutertre | H04L 9/3226 |
| | | | | 713/163 |
| 2005/0138384 | A1* | 6/2005 | Brickell | G06F 21/57 |
| | | | | 713/182 |
| 2005/0268103 | A1* | 12/2005 | Camenisch | H04L 9/3234 |
| | | | | 713/176 |
| 2007/0101412 | A1* | 5/2007 | Yang | G06F 21/305 |
| | | | | 726/5 |
| 2008/0083039 | A1* | 4/2008 | Choi | H04L 9/3236 |
| | | | | 726/27 |
| 2008/0294897 | A1 | 11/2008 | Patwardhan et al. | |
| 2009/0013181 | A1* | 1/2009 | Choi | H04L 63/123 |
| | | | | 713/168 |
| 2009/0210716 | A1* | 8/2009 | Chen | H04L 9/3218 |
| | | | | 713/176 |
| 2011/0010539 | A1 | 1/2011 | Salomone | |
| 2011/0067095 | A1* | 3/2011 | Leicher | H04L 63/12 |
| | | | | 726/10 |
| 2013/0262867 | A1* | 10/2013 | Evancich | H04L 9/3226 |
| | | | | 713/168 |
| 2013/0318343 | A1* | 11/2013 | Bjarnason | H04L 41/0809 |
| | | | | 713/157 |
| 2014/0095286 | A1* | 4/2014 | Drewry | G06Q 30/02 |
| | | | | 705/14.26 |
| 2015/0249647 | A1* | 9/2015 | Mityagin | H04L 67/1095 |
| | | | | 713/168 |
| 2017/0019251 | A1* | 1/2017 | Jain | H04L 9/12 |
| 2017/0163618 | A1* | 6/2017 | Peddada | H04L 9/3236 |
| 2017/0180341 | A1* | 6/2017 | Walker | H04L 9/3242 |
| 2017/0317997 | A1* | 11/2017 | Smith | G06Q 20/3829 |
| 2017/0353435 | A1* | 12/2017 | Pritikin | H04W 4/02 |
| 2018/0152307 | A1* | 5/2018 | Grover | H04L 9/3247 |
| 2018/0198620 | A1* | 7/2018 | Pearson | H04L 9/3247 |
| 2018/0198764 | A1* | 7/2018 | Kumar | H04L 63/126 |
| 2019/0020647 | A1* | 1/2019 | Sinha | H04L 9/006 |
| 2019/0044729 | A1* | 2/2019 | Chhabra | H04L 9/14 |
| 2019/0044740 | A1* | 2/2019 | Smith | H04L 9/3278 |
| 2019/0158468 | A1* | 5/2019 | Duong | H04L 9/0825 |
| 2019/0179801 | A1* | 6/2019 | Jang | G06F 16/137 |
| 2019/0220603 | A1* | 7/2019 | Gopalakrishnan | G06F 21/64 |
| 2019/0356482 | A1 | 11/2019 | Nix | |
| 2020/0089921 | A1* | 3/2020 | Karakoyunlu | H04L 9/0866 |
| 2020/0213311 | A1* | 7/2020 | Saha | H04L 9/3268 |
| 2020/0280550 | A1* | 9/2020 | Lindemann | H04L 63/0428 |
| 2020/0322145 | A1* | 10/2020 | Sheth | H04L 63/0892 |
| 2020/0322176 | A1* | 10/2020 | Bhandari | H04L 63/12 |
| 2020/0322262 | A1* | 10/2020 | Maino | H04L 67/04 |
| 2020/0322375 | A1* | 10/2020 | Sheth | H04L 61/103 |
| 2020/0322386 | A1* | 10/2020 | Mani | H04L 9/3234 |
| 2020/0396054 | A1* | 12/2020 | Wu | G06F 21/602 |
| 2021/0056053 | A1* | 2/2021 | Marson | G06F 13/1668 |
| 2021/0075626 | A1* | 3/2021 | Ilany | G06F 11/3476 |
| 2021/0119799 | A1* | 4/2021 | Ghosh | H04L 9/3213 |
| 2021/0126801 | A1* | 4/2021 | Nix | G06F 8/60 |
| 2021/0176255 | A1* | 6/2021 | Hill | H04L 9/3234 |
| 2021/0194912 | A1* | 6/2021 | Ward | H04L 63/105 |
| 2021/0281392 | A1* | 9/2021 | Sofia | H04L 9/3242 |
| 2021/0281553 | A1* | 9/2021 | Ward | G06F 21/53 |
| 2022/0038272 | A1* | 2/2022 | Hershman | H04L 9/0866 |
| 2022/0247576 | A1* | 8/2022 | Beekman | H04L 9/14 |

OTHER PUBLICATIONS

"WordPress Nonces," Codex, https://codex.wordpress.org/WordPress_Nonces, Jan. 22, 2021.

* cited by examiner

SYSTEMS AND METHODS FOR ADDRESSING CRYPTOPROCESSOR HARDWARE SCALING LIMITATIONS

TECHNICAL FIELD

The present disclosure generally relates to the field of data communications, and more specifically to systems and methods for addressing cryptoprocessor hardware scaling limitations.

BACKGROUND

Establishing the trustworthiness of a device operating within a network is critical to reducing or mitigating potential harm caused by the device. Technologies such as cryptoprocessors (e.g., hardware chips based on the Trust Computing Group's Trusted Platform Module (TPM2) specification) add capabilities which support the secure, real-time reporting of active trustworthiness measurements and evaluation from a remote network device. For example, a dedicated cryptoprocessor may take measures to attest the identity of a network device and its running binaries. These measures may confirm that the device is in a known safe state and/or is running known software. Based on the results, additional analysis and remediation methods can be invoked to mitigate the effects of attacks.

DESCRIPTION OF EXAMPLE EMBODIMENTS

Overview

According to an embodiment, a system may include one or more processors and one or more computer-readable non-transitory storage media comprising instructions that, when executed by the one or more processors, cause one or more components of the system to perform operations including, establishing a communication path between a centralized server and a client device; generating, by the centralized server, a nonce for transmission to the client device, wherein the nonce is associated with an active time interval and corresponds to one of an existing nonce or a new nonce; transmitting the nonce to the client device; receiving a signed attestation result that includes the nonce from the client device, wherein, the signed attestation result comprises a previously-generated signed attestation result if the nonce corresponds the existing nonce previously received by the client device; and the signed attestation result comprises a new signed attestation result if the nonce corresponds to the existing nonce newly received by the client device or corresponds to the new nonce.

Moreover, the active time interval may comprise a defined period of time during which the nonce is active. Additionally, the nonce may expire when the active time interval expires.

Moreover, the new nonce is generated when a previously-generated nonce expires.

Additionally, the operations may include transmitting the nonce to a plurality of client devices during the active time interval.

Also, the signed attestation result may be received from a tamper-resistant processing enclave of the client device. Further, the operations may further comprise analyzing the signed attestation result received from the client device; and transmitting to an authenticator an attestation decision associated with the client device, the attestation decision indicating whether attestation of the client device is successful based on the analyzing of the signed attestation result.

According to another embodiment, a method may include the steps of establishing a communication path between a centralized server and a client device; generating, by the centralized server, a nonce for transmission to the client device, wherein the nonce is associated with an active time interval and corresponds to one of an existing nonce or a new nonce; transmitting the nonce to the client device; receiving a signed attestation result that includes the nonce from the client device, wherein, the signed attestation result comprises a previously-generated signed attestation result if the nonce corresponds to the existing nonce previously received by the client device; and the signed attestation result comprises a new signed attestation result if the nonce corresponds to the existing nonce newly received by the client device or corresponds to the new nonce.

According to yet another embodiment, one or more computer-readable non-transitory storage media may embody instructions that, when executed by a processor, cause the performance of operations, including establishing a communication path between a centralized server and a client device; generating, by the centralized server, a nonce for transmission to the client device, wherein the nonce is associated with an active time interval and corresponds to one of an existing nonce or a new nonce; transmitting the nonce to the client device; receiving a signed attestation result that includes the nonce from the client device, wherein, the signed attestation result comprises a previously-generated signed attestation result if the nonce corresponds to the existing nonce previously received by the client device; and the signed attestation result comprises a new signed attestation result if the nonce corresponds to the existing nonce newly received by the client device or corresponds to the new nonce.

Technical advantages of certain embodiments of this disclosure may include one or more of the following. The systems and methods described herein may allow for mechanisms for large scale attestation of client devices (or peers) by employing a centralized Extensible Authentication Protocol (EAP) server to perform attestation using a time-based nonce having an active time interval. Thus, a single nonce may be used across the network for a specified period of time (corresponding to the active time interval), thereby increasing the scaling of hardware-based cryptoprocessor authentication mechanisms from dozens to concurrently connected peers to many thousands.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

A computer network may include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While the existence of numerous nodes may increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures may be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

To show that network traffic complies with specific policies may involve proving in a secure way that the traffic has traversed a well-defined set of network nodes (e.g., firewalls, switches, routers, etc.) and that such network nodes have not been modified or compromised. This may help ensure that the network nodes have performed their expected or intended actions (e.g., packet processing, security or policy compliance verification, routing, etc.) on the packet and that the packet has traversed the network nodes. Some security approaches may aim at removing any implied trust in the network used for connecting applications hosted on devices to cloud or enterprise hosted services. Moreover, some security approaches may be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches may be implemented to verify or validate the trustworthiness of a node in a network.

Hardware-based cryptoprocessors are increasingly being used to provide security or admission control credentials. Dedicated cryptoprocessors, such as a processor in a TPM platform, may take measurements to attest to the trustworthiness of a node and its environment (e.g., software, hardware, operating system, running binaries, firmware, etc.). These measurements may include evidence that the node is in a safe state. In some cases, these measurements can be provided through Remote Attestation Passports. Remote Attestation Passports are time-based attestation mechanisms that allow elements in a network to ascertain if the source of information has been compromised. In addition, these passports may provide structure to assign a level of trust to the information that is shared. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches may detect the replaying of old evidence via a "nonce." A nonce is an arbitrary number that may be used to introduce randomness for purposes of attestation. Further, a nonce can be passed into a TPM and/or incorporated into a canary stamp/metadata. In some cases, a result provided by the TPM can include a "quote" or signature based on the nonce. In order to protect against replay attacks, a nonce is conventionally used just once in a cryptographic communication, and a new nonce is transmitted for each transaction processed by a cryptoprocessor in an attesting device. As such, hardware based cryptoprocessors, e.g., such as used in smart phones, laptops, etc., are limited to processing a single digit number of transactions per second. As every TPM quote transaction might use a single nonce for replay protection, this limits the number of relying party devices an attesting device can serve via mechanisms like remote attestation. This significantly limits the number of network peers that may be authenticated. In a network comprising hundreds or thousands of peers, each corresponding to a session that may be originated from the attesting device, the attesting device is not able to scale its response to account for each separate nonce value that it receives. As such, there is a needed a mechanism to increase the scalability for uses cases that require attestation of large numbers of peers.

Particular embodiments of the present disclosure may provide for cryptoprocessor attestation through the generation of a reusable nonce having an active time interval, wherein, when the active time interval expires, the nonce expires or is rendered inactive and a new nonce is generated. Moreover, the reusable nonce is generated by a centralized EAP server rather than an authenticator or relying party. Since an EAP server is capable of supporting hundreds or thousands of authenticators or relying parties, the scale of peers which may be served greatly increases.

Figure 1:
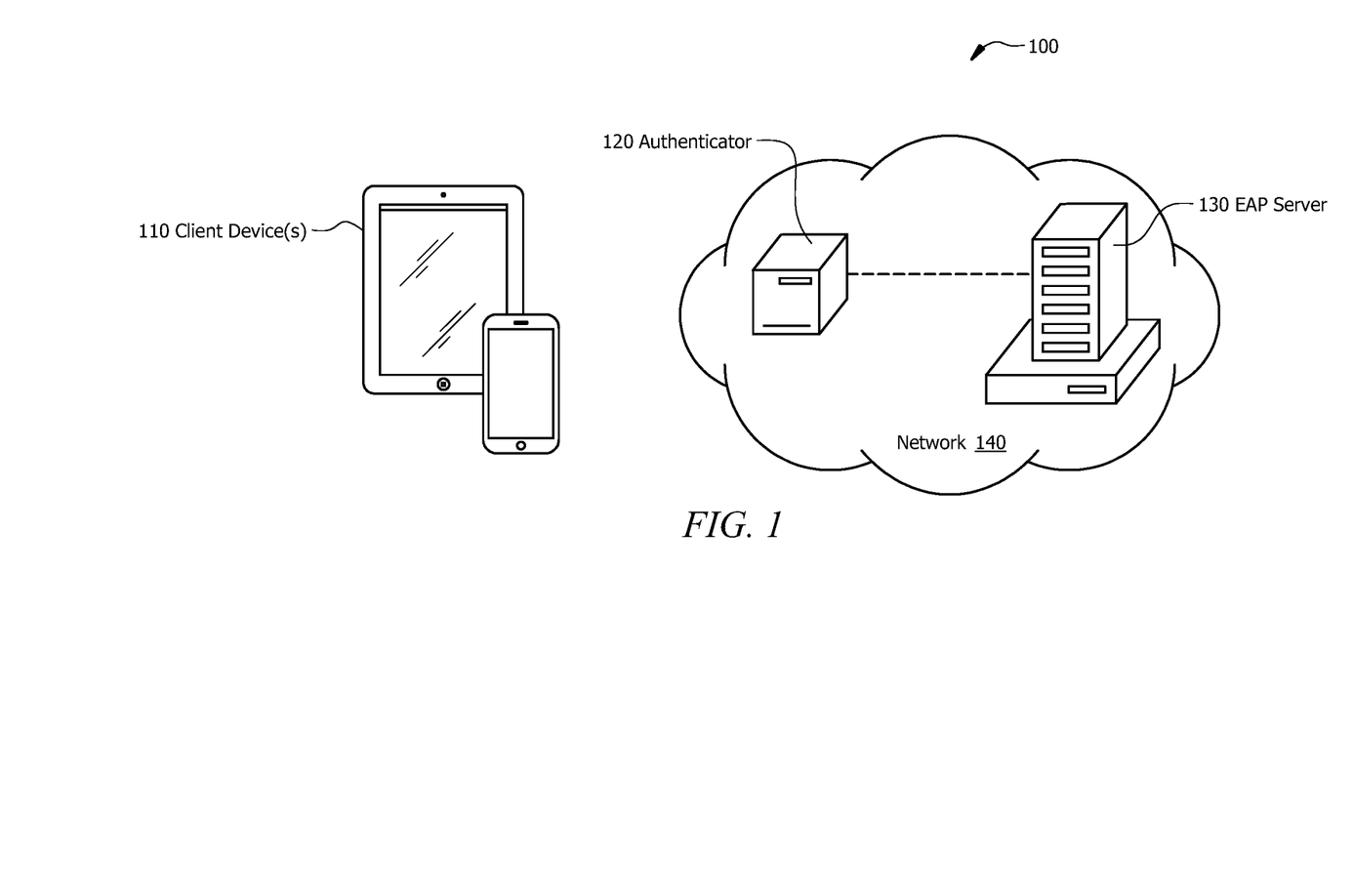
FIG. 1 illustrates a system for addressing cryptoprocessor hardware scaling limitations, in accordance with certain embodiments.

FIG. 1 depicts a system 100 for addressing cryptoprocessor hardware scaling limitations in accordance with the present disclosure. The basic architecture of system 100 is applicable for use in conjunction with the Extensible Authentication Protocol (EAP), but it is to be understood that system 100 may be adapted or otherwise modified for use in association with any authentication framework. Generally, and as shown in FIG. 1, system 100 includes at least the following participants: a client device 110, an authenticator 120, and an EAP server 130. While pertinent features are shown, those of ordinary skill in the art will appreciate from the present disclosure that various other features have not been illustrated for the sake of brevity and so as not to obscure aspects of the example implementations disclosed herein.

The client device 110 (also referred to as a "peer") may comprise a computer device, e.g., cell phone, laptop, tablet, etc., having a tamper-resistant processing enclave. The tamper-resistant processing enclave may comprise hardware-defined security protections that may be part of a computer processing unit (CPU) or may be within a separate chip in the client device 110. In an embodiment, the tamper-resistant processing enclave may comprise a secure enclave, as that term is understood and defined in the art. In another embodiment, the tamper-resistant processing enclave may comprise a trusted execution environment in a secure area of a main processor. In yet another embodiment, the tamper-resistant processing enclave may comprise a hardware security chip such as a cryptoprocessor. The client device 110 may request access to a network 140 (e.g., a wireless local area network (WLAN) or Local Area Network (LAN)) or a service made available by a peer device in the network 140 and, as a result, may require authentication by the network 140. The client device 110 contains the credentials used for authentication and may form one end of an EAP exchange. While FIG. 1 shows a single client device 110, it is to be understood system 100 may include a plurality of client devices, each requesting access to the network 140.

The authenticator 120 may comprise a wireless access point or a switch residing in the network 140 that controls access to the network 140. The term "authenticator" may broadly encompass various entities and/or functionalities, such as found in a verifier, relying party, and/or authenticator, each of which may comprise independent components operating in network 140. For purposes of the present disclosure, they are collectively referred to as an "authenticator." In general, the authenticator 120 may request and thereby obtain identity information from a client device 110 that is requesting access to the network 140. The authenticator 120 may then pass the identity information to the EAP server 130 for further authentication of the client device 110. In one embodiment, the authenticator 120 may unilaterally request identity information from the client device 110 and use the identity information to perform initial identification of a client device 110 that requests entry to the network 140. The authenticator 120 may provide this identity information to an EAP server 130, which performs further authentication of the client device 110. Once the EAP server 130 completes its authentication, it may return a "Success" or "Fail" message to the authenticator 120, indicating that the authentication either is successful or has failed. Based on the message provided by the EAP server 130, the authenticator 120, in turn, may allow or deny the client device 110 access to the network 140. In another embodiment, the authenticator 120 may take part in a mutual exchange of identity information with the client device 110 via the centralized EAP server 130. Once each party identifies itself to the other, the EAP server 130 may complete the authentication process, as described above. While FIG. 1 shows a single authenticator 120, it is to be understood that system 100 may include a plurality of authenticators, each operable to identify client devices requesting access to the network 140 and to pass such information to a communicably connected EAP server.

The EAP server 130 may comprise a centralized server or central authority residing in the network 140 and forming the second end of the EAP exchange. In an embodiment, the EAP server 130 may comprise a Remote Authentication Dial-In User Service (RADIUS) server supporting EAP. The EAP server 130 may perform authentication of the client device 110 and may return an EAP "Success" or "Fail" message, which is encapsulated in a packet for transmission to the client device 110. The EAP server 130 provides an extra layer of security and helps avoid "man-in-the-middle" attacks against the authenticator 120. In an embodiment, the EAP server 130 may be distributed over a set (i.e., the set comprising a plurality) of EAP servers.

Finally, system 100 may further comprise a network 140. In this example, the network 140 may include a network of interconnected nodes. The network may include a private network, such as a local area network (LAN), and/or a public network, such as a cloud network, a core network, and the like. In some implementations, the network 140 can also include one or more sub-networks, which may include, for example and without limitation, a LAN, a virtual local area network (VLAN), a datacenter, a cloud network, a wide area network (WAN), etc. In some examples, the sub-network can include a WAN, such as the Internet. In other examples, the sub-network can include a combination of nodes included within a LAN, VLAN, and/or WAN.

Figure 2:
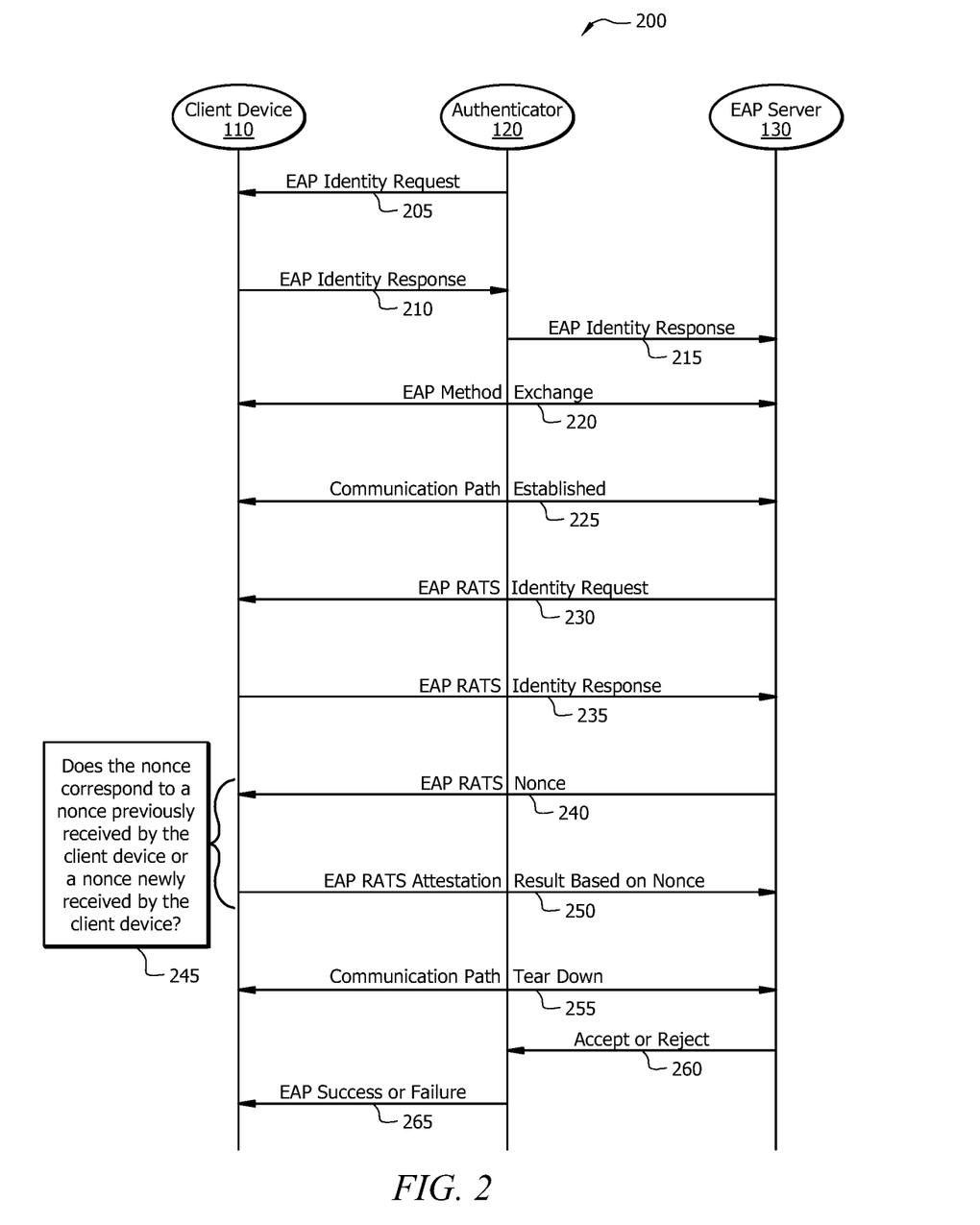
FIG. 2 illustrates a flow diagram of a method for addressing cryptoprocessor hardware scaling limitations, in accordance with certain embodiments.

Reference is now made to FIG. 2, wherein is shown an example flow diagram 200 for addressing cryptoprocessor hardware scaling limitations, according the present disclosure. Similar and corresponding terms described in conjunction with FIG. 1 may have the same meaning when used in conjunction with the flow diagram 200 of FIG. 2. As shown in FIG. 2, the flow diagram 200 may include three participants: a client device (such as client device 110 shown and described in conjunction with FIG. 1); an authenticator (such as authenticator 120 shown and described in conjunction with FIG. 1); and a centralized EAP server (such as EAP server 130 shown and described in conjunction with FIG. 1). In an embodiment, the flow diagram 200 presumes that the client device 110 attempts to access a network (such as network 140 of FIG. 1) and/or otherwise prove its authenticity, and therefore establishes communication with an authenticator 120 within the network 140. The flow diagram 200 further presumes the use of EAP methodology and protocol for authentication. In an embodiment, each communication between the client device 110 and the authenticator 120 may employ an EAP protocol, and each communication between the authenticator 120 and the EAP server 130 may employ Authentication, Authorization, and Accounting (AAA) via the RADIUS protocol.

At step 205, the authenticator 120 may transmit an EAP request to the client device 110, requesting the identity of the client device 110. At step 210, the client device 110 may transmit an EAP response, providing its identity information to the authenticator 120. At step 215, the authenticator 120 may forward the EAP response with the identity information of the client device 110 to the centralized EAP server 130. At step 220, the centralized EAP server 130 may initiate an EAP method exchange to allow mutual authentication to occur between the client device 110 and the centralized EAP server 130 via the authenticator 120. Specifically, an EAP method is selected by the EAP server 130 based on client configurations. Then, the EAP server 130 may send an authentication challenge to the client device 110 via the authenticator 120. The client device 110 may use a one-way encryption of a user-supplied password to generate a response to the challenge and may send that response to the centralized EAP server 130 via the authenticator 120. Using information from its user database, the centralized EAP server 130 may create its own response and compare that to the response from the client device 110. Once the centralized EAP server 130 authenticates the client device 110, the process may repeat in reverse, and the client device 110 may authenticate the centralized EAP server 130.

The method exchange of step 220 may be performed according to various EAP methods, including EAP Transport Layer Security (EAP-TLS), EAP Tunneled Transport Layer Security (EAP-TTLS), or the like. By way of example and not limitation, authentication via the EAP-TLS method provides a TLS tunnel between the client device 110 and centralized EAP server 130 and requires multiple certificates. A root certificate may be used to create and sign both a server certificate and a client certificate. The server certificate may be used by the centralized EAP server 130, and the client certificate may be used by the client device 110. Both devices have copies of the root certificate. When the client device 110 attempts to authenticate, the EAP server 130 may send its certificate to the client device 110. The client device 110 then verifies the server certificate against the root certificate. If the server certificate passes verification, the client device 110 may then supply its certificate to the EAP server 130, and the EAP server 130 may verify the client certificate against the root certificate. If that verification succeeds, the EAP server 130 may return an authentication success.

Once the method exchange is complete, as shown in step 225, a communication path may be established between the centralized EAP server 130 and the client device 110. Specifically, the communication path may comprise an encrypted tunnel established between the centralized EAP server 130 and the client device 110, with each side provisioning its side of the encrypted tunnel.

At step 230, the EAP server 130 commences attestation evaluation of the client device by initiating information exchanges (e.g., exchanges based on the Internet Engineering Task Force's (IETF) Remote Attestation Procedures (RATS) protocols and methodology). In network protocol exchanges, it is often the case that a relying party (in this case, the EAP server 130 acting on behalf of the authenticator 120) will require further identity evidence from the remote client device 110 in order to assess its trustworthiness. RATS enables relying parties to establish a level of confidence in the trustworthiness of a remote client device (and its components) through the creation of attestation evidence by remote system components and a processing chain towards the relying party. Based on the attestation evidence provided by the client device 110, the centralized EAP server 130 may then decide whether the client device is trustworthy or not. At step 235, the client device 110 may respond to RATS by providing its further identity evidence.

At step 240, the centralized EAP server 130, e.g., as part of the RATS methodology or otherwise, may then generate a time-based nonce for transmission to the client device 110 via the communication path, e.g., the encrypted tunnel. A nonce is a random or pseudo-random number issued in an authentication protocol to ensure that old communications cannot be reused in replay attacks. In accordance with the present disclosure, the critical features of a time-based nonce are two-fold. First, a time-based nonce is generated and transmitted to the client device 110 by the centralized EAP server 130, as opposed to the authenticator 120 (which, for purposes of the present disclosure, may include an authenticator, relying party, and/or verifier). Unlike an authenticator 120, an EAP server 130 is capable of supporting hundreds or thousands of authenticators and/or client devices; as such, hardware scaling may increase in several orders of magnitude. Second, a time-based nonce generated by the centralized EAP server 130 may be associated with an active time interval, rather than uniquely generated for each transaction. As the freshness of a nonce is critical to its efficacy, the active time interval may correspond to a defined period of time, e.g., 5 seconds, 10 seconds, 30 seconds, or the like, during which the nonce is active (i.e., valid and unexpired). In an embodiment, the active time interval may correspond to 5 seconds, which may, in one instance, be sufficient to guarantee freshness of the nonce. However, it is to be understood that the active time interval may be configured to any measure of time, as deemed appropriate for particular deployments and/or embodiments. During the active time interval, the same (active) nonce may be generated by the centralized EAP server 130 and transmitted to any number of client devices. Once the active time interval has expired, the nonce may also expire, i.e., be rendered inactive or invalid, thereby reducing the risk of replay attacks. Additionally, once the active time interval has expired, the EAP server may generate a new time-based nonce having its own active time interval.

As described above, a network 140 may include hundreds or thousands of client devices or peers. Thus, during a given active time interval, the centralized EAP server 130 may send the active nonce to hundreds or thousands of client devices, based on the number of attestations required during that time interval. Thus, if the centralized EAP server 130 handles a plurality of client devices, the centralized EAP server 130 may safely transmit the same nonce to a first client device in conjunction with a first authenticator within the same time frame (i.e., during the period of the active time interval) as a plurality of other client devices traversing a plurality of other authenticators.

Moreover, since a time-based nonce is associated with an active time interval, a given nonce generated and transmitted by the centralized EAP server 130 may correspond to either an "existing nonce" or a "new nonce." An "existing nonce" refers to a previously-generated nonce that is still active and/or unexpired (i.e., its associated active time interval has not expired). In some cases, the existing nonce may refer to the immediately preceding nonce generated by the centralized EAP server 130 whose active time interval has not expired. Once the active time interval of the existing nonce has expired, a new nonce may be generated.

A "new nonce" refers to a newly generated nonce. Thus, the time-based nonce generated by the centralized EAP server may correspond to a new nonce if the previously-generated or immediately preceding nonce is inactive or expired, i.e., the active time interval associated with the previously-generated nonce has expired. The new nonce comprises a new value as compared to the previously-generated or immediately preceding nonce that was generated by the EAP server, and is associated with its own active time interval.

It is to be understood that the term "generate" (in the context of the centralized EAP server 130 "generating" the time-based nonce) is to be construed broadly and may comprise the "generating" of an existing nonce (i.e., by bringing up, retrieving, obtaining, or otherwise producing the existing nonce that has previously been generated by the centralized EAP server 130) and the "generating" of a new nonce (i.e., by creating, originating, developing, or otherwise bringing forth the new nonce that is newly generated by the centralized EAP server 130).

At step 245, the client device 110, upon receiving the time-based nonce transmitted by the centralized EAP server 130, may determine whether the nonce corresponds to a nonce previously received by the client device or a nonce newly received by the client device. Specifically, the client device 110 may determine whether the value of the nonce is the same as compared to the value of the last or immediately preceding nonce received by the client device 110 from the centralized EAP server 130, or whether the value of the nonce is a new value as compared to the last or immediately preceding nonce received by the client device 110 from the centralized EAP server 130. Depending on the frequency of transactions between the centralized EAP server 130 and a given client device 110, an existing nonce may have previously been received by the client device 110 (e.g., in a preceding transaction), or an existing nonce may be newly received by the client device (i.e., received by the client device 110 for the first time). A new nonce generated by the EAP server 130 may be newly received by the client device.

If the nonce transmitted by the centralized EAP server 130 corresponds to an existing nonce previously received by the client device 110, then the client device 110 may respond to the centralized EAP server 130 by transmitting a signed attestation result corresponding to a "previously-generated signed attestation result," i.e., a signed attestation result that that was previously-generated and stored in the client device 110 and that was last transmitted in response to the existing nonce previously received by the client device 110 from the centralized EAP server 130. If, however, the nonce transmitted by the centralized EAP server 130 corresponds in value to an existing nonce that is newly received by the client device 110, or a new nonce that is newly received by the client device 110, then the client device 110 may respond to the centralized EAP server 130 by transmitting a signed attestation result corresponding to a "new signed attestation result", i.e., a signed attestation result that is newly generated by the client device 110 in response to the newly received nonce from the centralized EAP server 130.

At step 250, the client device 110 may transmit to the centralized EAP server 130 a signed attestation result — either a previously-generated signed attestation result or a new signed attestation result — based on the results of the determination in step 245. The signed attestation result includes the nonce transmitted by the EAP server 130 and received by the client device 110 in step 240. In an embodiment, the signed attestation result sent by the client device 110 may include a signed set of Platform Configuration Register (PCR) quotes, the signed set comprising one or more PCR quotes. In an embodiment, the attestation result may be generated within the tamper-resistant processing enclave (e.g., secure enclave, cryptoprocessor, or other secure environment within a CPU) of the client device 110. In another embodiment, the attestation result may be generated from a TPM. The centralized EAP server 130 may analyze the signed attestation result received from the client device 110, and determine whether the client device 110 is considered trustworthy from the point of view of the authenticator 120. This determination may be made in accordance with IETF and/or procedures known in the art.

In accordance with the present disclosure, when a signed attestation result (which includes the nonce) is received at the EAP server 130, the EAP server 130 verifies the attestation result including the associated nonce. As part of this verification, the EAP server 130 must determine whether the nonce is still active. It may be the case that the EAP server 130 has transmitted an active nonce to the client device 110 at step 240, but the nonce has expired before the EAP server 130 receives the signed attestation result from the client device 110. To address this scenario, a buffer period—defined as a short interval of time corresponding to, e.g., a few milliseconds, etc.—may be appended to the active time interval of a nonce to enable the EAP server 130 to receive and verify in-transit responses from the client device 110. In other words, the buffer period may allow the EAP server 130 to receive and verify the signed attestation result and associated nonce from a client device 110 for a brief, pre-defined period of time after expiration of the nonce. The buffer period will not impact the EAP server's 130 ability to generate a new nonce after expiration of the existing nonce nor to render the existing nonce inactive or expired upon expiration of the active time interval, but rather allows a signed attestation result to be received and verified by the EAP server 130 for a brief period after expiration of a nonce. It is to be understood that the buffer period may be configured to any interval of time.

In accordance with the present disclosure, because the time-based nonce may be reused, i.e., transmitted by the centralized EAP server 130 more than once (and indeed, a plurality of times) during the active time interval, the client device 110 receiving the time-based nonce only has to generate a new attestation result in conjunction with a newly received nonce. In other words, for each existing nonce that has previously been received by the client device 110, the client device 110 may send out a previously-generated and stored signed attestation result, thereby reducing processing inefficiencies, increasing speed, and reducing the number of interactions between the various devices.

At step 255, once the attestation result has been received by the centralized EAP server 130 and attestation of the client device 110 is complete, the communication path, e.g., the encrypted tunnel, may be torn down. At step 260, the centralized EAP server 130 may send transmit an "accept" or "reject" message to the authenticator 120. An "accept" message may be transmitted if the attestation of the client device is successful; a "reject" message may be transmitted if the attestation of the client device is unsuccessful. At step 265, based on the message received from the centralized EAP server 130, the authenticator 120 may transmit a corresponding message to the client device 110, i.e., "Attestation Success" or "Attestation Failed", which may result in either allowing or denying the client device 110 access to the network 140, in accordance with EAP methodology.

Figure 3:
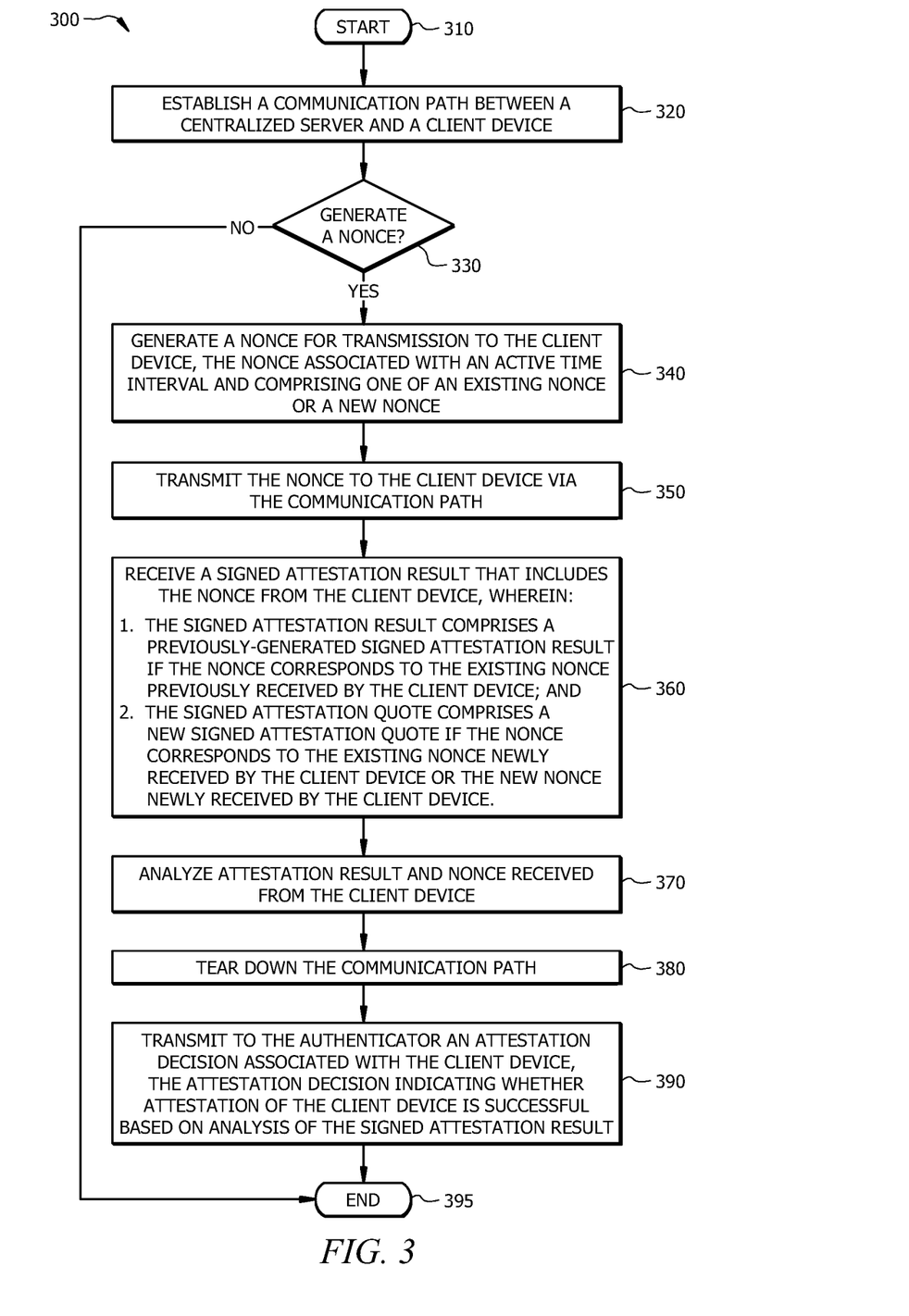
FIG. 3 illustrates another flow diagram of a method for addressing cryptoprocessor hardware scaling limitations, in accordance with certain embodiments.

Reference is now made to FIG. 3, wherein is shown another example flow diagram of a method 300 for addressing cryptoprocessor hardware scaling limitations, according the present disclosure. The steps of method 300 may be in accord with the operations outlined in conjunction with the system 100 of FIG. 1 and the flow diagram 200 of FIG. 2. As such, similar and corresponding terms described in conjunction with FIGS. 1 and 2 may have the same meaning when used in conjunction with method 300 of FIG. 3. Additionally, the present disclosure incorporates by reference the descriptions of FIGS. 1 and 2 for the purposes of explaining, expounding upon, or otherwise clarifying the steps of method 300.

It is to be understood that method 300 may be performed in conjunction with a system that comprises at least the following: a client device, an authenticator, and a centralized EAP server, as described above in conjunction with FIGS. 1 and 2. In an embodiment, the steps of method 300 may be performed from the perspective of the centralized EAP server. However, it is to be understood that method 300 may be performed by any component, element, or module in a network without departing from the spirit or scope of the present disclosure. In an embodiment, method 300 presumes that the client device attempts to access a network (such as network 140 of FIG. 1) and/or otherwise prove its authenticity, and therefore establishes communication with an authenticator within the network. Method 300 further presumes that the authenticator receives identity information from the client device and transmits the identity information to the centralized EAP server for further authentication of the client device. Additionally, method 300 presumes that the centralized EAP server initiates an EAP method exchange to allow mutual authentication to occur between the client device and the centralized EAP server via the authenticator. The EAP method may be selected by the EAP server based on configurations. In an embodiment, the foregoing presumptions may be in accordance with one or more of steps 205-220 of the flow diagram 200 of FIG. 2. Method 300 also presumes the use of EAP methodology and protocol for authentication.

The method may begin at step 310. At step 320, a communication path may be established between the centralized EAP server and the client device. In an embodiment, the communication path may comprise an encrypted tunnel between the centralized server and the client device, with each side provisioning its side of the encrypted tunnel. Once the communication path has been established, the centralized EAP server may commence attestation evaluation of the client device by initiating information exchanges (e.g., exchanges based on RATS protocols and methodology).

At step 330, a determination may be made by the centralized EAP server as to whether to generate a time-based nonce. This determination made be made in conjunction with the attestation of the client device via RATS protocols or other attestation procedures in order to assess its trustworthiness. if, at step 330, it is determined that a time-based nonce is not to be generated. the method 300 may end at step 395. However, if, at step 330, it is determined that a time-based nonce is to be generated, the method may proceed to step 340.

At step 340, the centralized EAP server may generate a time-based nonce for transmission to the client device via the communication path. That the centralized EAP server generates the time-based nonce (as opposed to an authenticator, which, for purposes of the present disclosure, may include an authenticator, relying party, and/or verifier) is important because, unlike an authenticator, the centralized EAP server is capable of supporting hundreds or thousands of authenticators and/or client devices, and as a result, authenticating at least as many client devices. This results in increased hardware scaling by several orders of magnitude.

Additionally, the time-based nonce may be associated with an active time interval, rather than uniquely generated for each transaction. As the freshness of a nonce is critical to its efficacy, the active time interval may be a defined period of time during which the nonce is active. In an embodiment, the active time interval may correspond to 5 seconds, which may, in one instance, be sufficient to guarantee freshness of the nonce. However, it is to be understood that the active time interval may be configured to any measure of time, as deemed appropriate to ensure freshness for particular deployments and/or embodiments. During the active time interval, the same (active) nonce may be generated by the centralized EAP server and transmitted to any number of client devices. Once the active time interval has expired, the time-based nonce may also expire, i.e., be rendered inactive or invalid, thereby reducing the risk of replay attacks. Additionally, once the active time interval has expired, the EAP server may generate a new time-based nonce having its own active time interval.

Furthermore, as described above, since a network may include hundreds or thousands of client devices or peers, the centralized EAP server may send the active nonce to hundreds or thousands of client devices during its active time interval, based on the number of attestations required during that time interval. Thus, a centralized EAP server handling a plurality of client devices may safely transmit the same nonce to a first client device in conjunction with a first authenticator within the same time frame (i.e., during the period of the active time interval) as a plurality of other client devices traversing a plurality of other authenticators.

Moreover, the time-based nonce generated by the centralized EAP server may correspond to either an "existing nonce" or a "new nonce." An "existing nonce" refers to a previously-generated nonce that is still active or unexpired. In other words, the active time interval associated with an existing nonce has not expired. Once the active time interval of the existing nonce has expired, the existing nonce expires and a new nonce may be generated.

"new nonce" refers to a newly generated nonce. The time-based nonce generated by the centralized EAP server may correspond to a new nonce if the previously-generated or immediately preceding nonce is inactive or expired, i.e., the active time interval associated with the previously-generated or immediately preceding nonce has expired. The new nonce comprises a new value as compared to the previously-generated or immediately preceding nonce that was generated by the EAP server, and is associated with its own time interval.

As described above, it is to be understood that the term "generate" (in the context of the centralized EAP server "generating" the time-based nonce) is to be construed broadly and may comprise the "generating" of an existing nonce and/or the "generating" of a new nonce.

At step 350, the centralized EAP server may transmit the time-based nonce to the client device via the communication path. On the client device side, upon receiving the time-based nonce from the centralized EAP server, the client device may determine whether the nonce corresponds to a nonce previously received by the client device or a nonce newly received by the client device. Specifically, the client device may determine whether the value of the nonce is the same as compared to the value of the previously received or immediately preceding nonce received from the centralized EAP server, or whether the value of the nonce is a new value as compared to the previously received or immediately preceding nonce received from the centralized EAP server. Depending on the frequency of transactions between the centralized EAP server and the client device, an existing nonce may have previously been received by the client device (e.g., in an earlier or preceding transaction), or an existing nonce may be newly received by the client device (i.e., received by the client device for the first time). A new nonce may be newly received by the client device. Based on the client device's determination of whether the nonce corresponds to a previously received nonce or a newly received nonce, the client device may transmit an appropriate signed attestation result (including the nonce) to the centralized EAP server, as described below.

At step 360, the centralized server may receive a signed attestation result that includes the nonce from the client device. Specifically, based on the determination by the client device of whether the nonce is a nonce that it has previously received or a nonce that is newly received, the client device may transmit, and the centralized EAP server may receive, a signed attestation result comprising either a "previously-generated signed attestation result" or a "new signed attestation result." In particular, if the nonce transmitted by the EAP server corresponds to an existing nonce previously received by the client device, then the client device may return to the EAP server a signed attestation result comprising to a previously-generated signed attestation result, i.e., a signed attestation result that that was previously-generated and stored in the client device in response to the previously received nonce. If, however, the time-based nonce transmitted by the EAP server corresponds to an existing nonce that is newly received by the client device or a new nonce that is newly received by the client device, then the client device may transmit to the EAP server a signed attestation result comprising a new signed attestation result, i.e., a signed attestation result that is newly generated by the client device in response to the newly received nonce from the centralized EAP server. In an embodiment, the signed attestation result sent by the client device may comprise a signed set of PCR quotes (i.e., the signed set comprising one or more PCR quotes) based on TPM. In an embodiment, the attestation result may be generated within the tamper-resistant processing enclave (e.g., secure enclave, cryptoprocessor, or other secure environment within a CPU) of the client device. In another embodiment, the attestation result may be generated from a TPM.

In an embodiment, a buffer period, namely a short interval of time, may be appended to the active time interval of a nonce to enable the EAP server to receive and verify in-transit responses from the client device for a brief, pre-defined period of time after expiration of the nonce. The buffer period will not impact the EAP server's ability to generate a new nonce after expiration of the existing nonce, but rather allows signed attestation results to be received and verified in cases where the EAP server has transmitted an active nonce to the client device, but the nonce has expired before the EAP server receives the signed attestation result from the client device. It is to be understood that the buffer period may be configured to any interval of time, as deemed appropriate for particular deployments and/or embodiments.

At step 370, the centralized EAP server may analyze the signed attestation result (including the nonce) received from the client device to determine whether attestation of the client device is successful. At step 380, the centralized EAP server may tear down the communication path. At step 390, the centralized EAP server may transmit to the authenticator an attestation decision associated with the client device, the attestation decision indicating whether attestation of the client device is successful based on analysis of the signed attestation result, i.e., an "accept" message may be transmitted if the attestation of the client device is successful; a "reject" message may be transmitted if the attestation of the client device is unsuccessful. Based on the attestation results received from the EAP server, the authenticator may transmit a corresponding message to the client device, i.e., "Attestation Success" or "Attestation Failed", which may result in either allowing or denying the client device access to the network, in accordance with EAP methodology. At step 395, the method may end.

The systems and methods of the present disclosure may provide various benefits to hardware-based cryptoprocessor authentications. In accordance with the present disclosure, because the time-based nonce may be reused, i.e., transmitted by the centralized EAP server more than once (and indeed, a plurality of times) during the active time interval, the client device receiving the time-based nonce only has to generate a new attestation result in conjunction with a newly received nonce. In other words, each time an existing nonce that was previously received by the client device is sent to the client device, it may send out an existing (previously-stored) attestation result, thereby reducing processing inefficiencies, increasing speed, and reducing the number of interactions between the various devices.

The systems and methods of the present disclosure may provide additional benefits on the server side as well. For example, an EAP server's scalability may also be improved in that when the EAP server sends an existing nonce and receives a previously-generated signed attestation result (i.e., a result that may have been previously transmitted to the EAP server), the EAP server will not have to again validate the signed attestation result, PCRs or other associated elements in the EAP-RATS payload. The result is improved verification and increased server efficiency.

In sum, the systems and methods of the present disclosure may allow for the increased scale of hardware-based cryptoprocessor authentication mechanisms from dozens to concurrently connected peers to many thousands, limited only by the number of EAP servers that may be deployed to validate the credentials of client devices. The present disclosure may be applicable in variety of uses cases and contexts, including Trust Path Routing (TPR), broadband network gateway (BNG) aggregation, cloud application admission control, web applications requiring authentication of thousands of peers, and the like. Additionally, the concepts described in the present disclosure may be appended to existing technologies, e.g., Bloom Filters. For example, Bloom Filters may be used in conjunction with the mechanisms of the present disclosure where a client device is handling EAP authentication from different EAP server domains.

Figure 4:
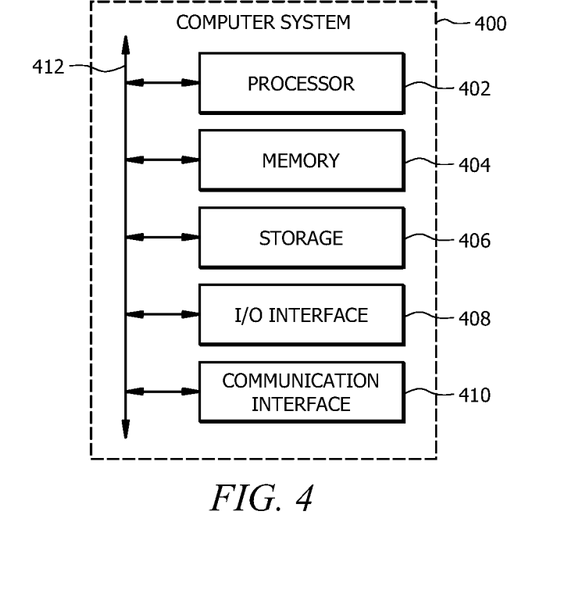
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
   one or more processors;
   one or more computer-readable non-transitory storage media comprising instructions that, when executed by the one or more processors, cause one or more components of the system to perform operations comprising:
     establishing a communication path between a centralized server and a client device;
     generating, by the centralized server, a nonce for transmission to the client device, wherein the nonce is associated with an active time interval and corresponds to one of an existing nonce or a new nonce;
     transmitting the nonce to the client device;
     receiving a signed attestation result that includes the nonce from the client device, wherein:
       the signed attestation result comprises a previously-generated signed attestation result if the nonce corresponds to the existing nonce previously received by the client device; and
       the signed attestation result comprises a new signed attestation result if the nonce corresponds to the existing nonce newly received by the client device or corresponds to the new nonce.

2. The system of claim 1, wherein the active time interval comprises a defined period of time during which the nonce is active.

3. The system of claim 2, wherein the nonce expires when the active time interval expires.

4. The system of claim 1, wherein the new nonce is generated when a previously-generated nonce expires.

5. The system of claim 1, the operations further comprising:
transmitting the nonce to a plurality of client devices during the active time interval.

6. The system of claim 1, wherein the signed attestation result is received from a tamper-resistant processing enclave of the client device.

7. The system of claim 1, the operations further comprising:
analyzing the signed attestation result received from the client device; and
transmitting to an authenticator an attestation decision associated with the client device, the attestation decision indicating whether attestation of the client device is successful based on the analyzing of the signed attestation result.

8. A method, comprising:
establishing a communication path between a centralized server and a client device;
generating, by the centralized server, a nonce for transmission to the client device, wherein the nonce is associated with an active time interval and corresponds to one of an existing nonce or a new nonce;
transmitting the nonce to the client device;
receiving a signed attestation result that includes the nonce from the client device, wherein:
the signed attestation result comprises a previously-generated signed attestation result if the nonce corresponds to the existing nonce previously received by the client device; and
the signed attestation result comprises a new signed attestation result if the nonce corresponds to the existing nonce newly received by the client device or corresponds to the new nonce.

9. The method of claim 8, wherein the active time interval comprises a defined period of time during which the nonce is active.

10. The method of claim 9, wherein the nonce expires when the active time interval expires.

11. The method of claim 8, wherein the new nonce is generated when a previously-generated nonce expires.

12. The method of claim 8, further comprising:
transmitting the nonce to a plurality of client devices during the active time interval.

13. The method of claim 8, wherein the signed attestation result is received from a tamper-resistant processing enclave of the client device.

14. The method of claim 8, further comprising:
analyzing the signed attestation result received from the client device; and
transmitting to an authenticator an attestation decision associated with the client device, the attestation decision indicating whether attestation of the client device is successful based on the analyzing of the signed attestation result.

15. One or more computer-readable non-transitory storage media embodying instructions that, when executed by a processor, cause performance of operations comprising:
establishing a communication path between a centralized server and a client device;
generating, by the centralized server, a nonce for transmission to the client device, wherein the nonce is associated with an active time interval and corresponds to one of an existing nonce or a new nonce;
transmitting the nonce to the client device;
receiving a signed attestation result that includes the nonce from the client device, wherein:
the signed attestation result comprises a previously-generated signed attestation result if the nonce corresponds to the existing nonce previously received by the client device; and
the signed attestation result comprises a new signed attestation result if the nonce corresponds to the existing nonce newly received by the client device or corresponds to the new nonce.

16. The one or more computer-readable non-transitory storage media of claim 15, wherein the active time interval comprises a defined period of time during which the nonce is active.

17. The one or more computer-readable non-transitory storage media of claim 16, wherein the nonce expires when the active time interval expires.

18. The one or more computer-readable non-transitory storage media of claim 15, wherein the new nonce is generated when a previously-generated nonce expires.

19. The one or more computer-readable non-transitory storage media of claim 15, the operations further comprising:
transmitting the nonce to a plurality of client devices during the active time interval.

20. The one or more computer-readable non-transitory storage media of claim 15, wherein the signed attestation result is received from a tamper-resistant processing enclave of the client device.

* * * * *